United States Patent
Perälä et al.

(10) Patent No.: US 7,570,881 B2
(45) Date of Patent: Aug. 4, 2009

(54) COLOR BALANCED CAMERA WITH A FLASH LIGHT UNIT

(75) Inventors: Mikko Perälä, Tampere (FI); Ossi Kalevo, Toijala (FI); Jyrki Huusko, Tampere (FI); Janne Tamminen, Tampere (FI)

(73) Assignee: Nokia Corporation, Espoo (FI)

( * ) Notice: Subject to any disclaimer, the term of this patent is extended or adjusted under 35 U.S.C. 154(b) by 311 days.

(21) Appl. No.: 11/359,874

(22) Filed: Feb. 21, 2006

(65) Prior Publication Data
US 2007/0196095 A1    Aug. 23, 2007

(51) Int. Cl.
*G03B 15/03* (2006.01)

(52) U.S. Cl. ............ 396/182; 348/188; 348/224.1

(58) Field of Classification Search ............ 396/182; 348/224.1, 188, 223.1
See application file for complete search history.

(56) References Cited

U.S. PATENT DOCUMENTS

| | | | |
|---|---|---|---|
| 5,065,232 A | | 11/1991 | Kondo |
| 5,221,963 A * | | 6/1993 | Hashimoto et al. ......... 348/234 |
| 5,473,375 A * | | 12/1995 | Takayama et al. ......... 348/364 |
| 5,760,829 A * | | 6/1998 | Sussmeier ................ 348/187 |
| 5,831,672 A * | | 11/1998 | Takei ..................... 348/225.1 |
| 6,734,899 B1 * | | 5/2004 | Okamoto ................ 348/188 |
| 6,906,751 B1 * | | 6/2005 | Norita et al. ............ 348/349 |
| 7,468,746 B2 * | | 12/2008 | Sugimoto ............... 348/229.1 |
| 2003/0052992 A1 | | 3/2003 | Nakata |
| 2004/0017594 A1 | | 1/2004 | Suekane et al. |
| 2004/0196643 A1 | | 10/2004 | Terada et al. |
| 2004/0240872 A1 * | | 12/2004 | Chikugawa ............. 396/182 |
| 2004/0263678 A1 | | 12/2004 | Kawakami |
| 2005/0134723 A1 | | 6/2005 | Lee et al. |
| 2005/0151855 A1 | | 7/2005 | Kim |
| 2005/0151856 A1 | | 7/2005 | Honda |

FOREIGN PATENT DOCUMENTS

JP    2001275122    10/2001

OTHER PUBLICATIONS

Canon Power Shot A620/A610, Advanced Camera User Guide, 2005; Canon, Inc.; pp. 55-57.

* cited by examiner

*Primary Examiner*—William B Perkey
(74) *Attorney, Agent, or Firm*—Alfred A. Fressola; Ware, Fressola, Van Der Sluys & Adolphson LLP

(57) ABSTRACT

The imaging device comprises a flash light unit, an imaging unit, a memory comprising predetermined color balance parameters specific to the individual flash light unit, and an image processor to correct the image colors based on the parameters. The predetermined parameters are determined by imaging a white test target and stored into memory. The predetermined parameters are applied at a later stage for the color correction of actual images. Consistent image colors may be guaranteed in mass production of the imaging devices although the individual flash light units may have different spectral properties.

28 Claims, 6 Drawing Sheets

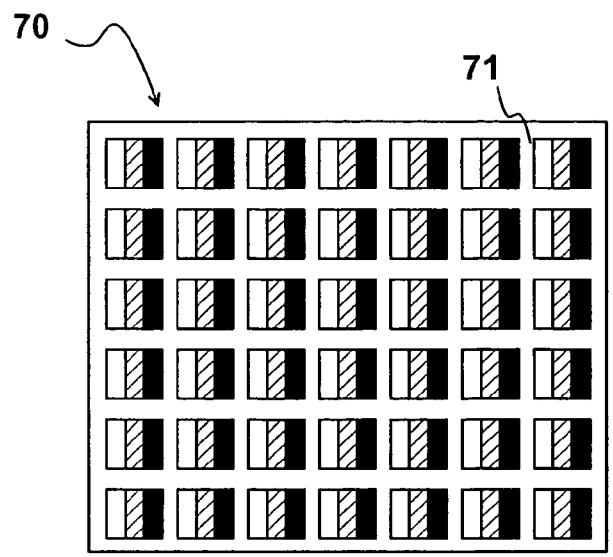
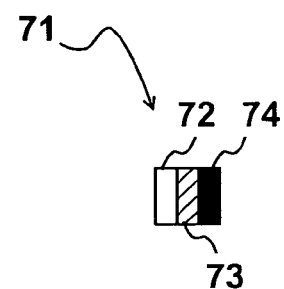
Fig 2a
Fig 2b
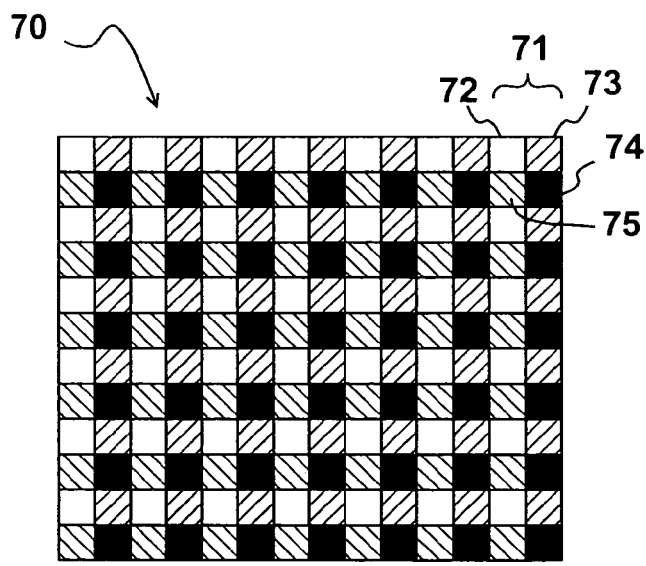
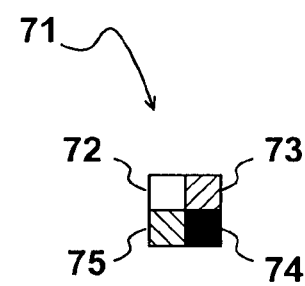
Fig 2c
Fig 2d

COLOR BALANCED CAMERA WITH A FLASH LIGHT UNIT

TECHNICAL FIELD

The present invention relates to controlling of image colors in imaging when illumination is provided by a flash light unit. The present invention relates also to an imaging device, to the manufacturing of imaging devices, and to the calibration of imaging devices, said imaging devices having a flash light unit.

BACKGROUND OF THE INVENTION

Flash light may be used when taking photographs in poor illumination conditions. The color temperature of the flash light may deviate substantially from the color temperature of natural day light, i.e. sunlight. Consequently, the colors of photos taken using flash light may appear unnatural.

U.S. patent application 2004/0196643 discloses a photography light source comprising a plurality of LED (light emitting diode) elements. According to the teaching, the light source may comprise a red LED element generating red light, a green LED element generating green light and a blue LED element generating blue light. The mixing ratio of the colors may be adjusted to set the color temperature of the illuminating light to achieve colors which are characteristic of photography under natural light.

U.S. patent application 2005/0134723 discloses an image acquisition system comprising a camera and a light module, said light module providing flash light having adjustable spectral content.

SUMMARY OF THE INVENTION

The main object of the present invention is to provide a method of manufacturing a plurality of portable imaging devices. The object of the present invention is also to provide a method of adjusting the color balance of a portable imaging device. The object of the present invention is also to provide a computer program product for implementing said method. The object of the present invention is also to provide a calibration set-up for determining color balance parameters for an imaging device. A further object of the present invention is to provide a portable imaging device comprising a flash light unit. Yet, an object of the present invention is to provide a method of acquiring an image.

According to a first aspect of the invention, there is a method of manufacturing a plurality of portable imaging devices, said devices having substantially identical mechanical construction, each of said imaging devices comprising:
  a flash light unit to illuminate an object,
  an imaging unit to acquire an image of the object
  a memory to store predetermined color balance parameters specific to said individual flash light unit, and
  an image processing unit to correct the color of said acquired image based on said color balance parameters, said method in turn comprising:
  illuminating a test target by flash light provided by said flash light unit,
  acquiring a test image of said test target,
  determining said color balance parameters based on said test image, and
  storing said color balance parameters into said memory.

According to a second aspect of the invention, there is a method of adjusting the color balance of a portable imaging device
  said imaging device comprising:
  a flash light unit to illuminate an object,
  an imaging unit to acquire an image of the object
  a memory to store predetermined color balance parameters specific to said individual flash light unit, and
  an image processing unit to correct the color of said acquired image based on said color balance parameters, said method in turn comprising:
  illuminating a test target by flash light provided by said flash light unit,
  acquiring a test image of said test target,
  determining said color balance parameters based on said test image, and
  storing said color balance parameters into said memory.

According to a third aspect of the invention, there is a computer program product for determining color balance parameters for an imaging device, said device comprising:
  a flash light unit to illuminate an object,
  an imaging unit to acquire an image of the object
  a memory to store the determined color balance parameters, said parameters being specific to said individual flash light unit, and
  an image processing unit to correct the color of said acquired image based on said color balance parameters, said computer program product comprising computer program code sections stored in a readable medium, which when executed by a processor are for
  operating said flash light unit to illuminate a test target,
  operating said imaging unit to acquire a test image of said test target,
  calculating the average ratio of a first color component to a second color component based on the first and second color components of pixels of said test image, and
  determining at least one color balance parameter on the basis of said ratio, and
  storing said at least one color balance parameter into the memory of said imaging device.

According to a fourth aspect of the invention, there is a calibration set-up for determining color correction parameters for an imaging device, said device comprising:
  a flash light unit to illuminate an object,
  an imaging unit to acquire an image of the object
  a memory to store the color balance parameters, said parameters being specific to said individual flash light unit, and
  an image processing unit to correct the color of said acquired image based on said color balance parameters, said calibration set-up in turn comprising:
  a neutral color test target arranged to be in the field of view of said imaging unit,
  command means to command said imaging device to acquire a test image of said test target,
  a data processor to determine at least one color correction parameter by calculating the average ratio of a first color component to a second color component based on the first and second color components of the pixels of said test image, and
  means to store the determined color correction parameters into the memory of the imaging device.

According to a fifth aspect of the invention, there is a portable imaging device comprising:

a flash light unit to illuminate an object, said flash light unit comprising one or more light emitting diodes, an imaging unit to acquire an image of the object a memory comprising predetermined color balance parameters specific to said individual flash light unit, and an image processing unit to correct the color of said acquired image based on said color balance parameters.

According to a sixth aspect of the invention, there is a method of acquiring an image, said method comprising:

illuminating an object by flash light provided by a flash light unit, acquiring a primary image of the object, and processing said primary image based on predetermined color balance parameters specific to said individual flash light unit.

The imaging device comprises a flash light unit, an imaging unit, a memory comprising predetermined color balance parameters specific to said individual flash light unit, and an image processor to correct the image colors based on said parameters. The color balance parameters are matched with the color of light provided by said individual flash light unit. The predetermined parameters are determined by imaging a neutral color test target and subsequently stored into memory. The predetermined parameters are applied at a later stage for color correction of actual images taken by an end-user. Thus, consistent image colors may be guaranteed although the individual flash light units and/or other components of the manufactured imaging devices may have different spectral properties.

The embodiments of the invention and their benefits will become more apparent to a person skilled in the art through the description and examples given herein below, and also through the appended claims.

BRIEF DESCRIPTION OF THE FIGURES

In the following examples, the embodiments of the invention will be described in more detail with reference to the appended drawings in which FIG. 2a shows schematically the arrangement of pixels on an image sensor, FIG. 2b shows schematically sub-pixels of an image pixel, FIG. 2c shows schematically the arrangement of sub-pixels on a Bayer image sensor, FIG. 2d shows schematically the image pixel of the Bayer image sensor.

DETAILED DESCRIPTION

Figure 1:
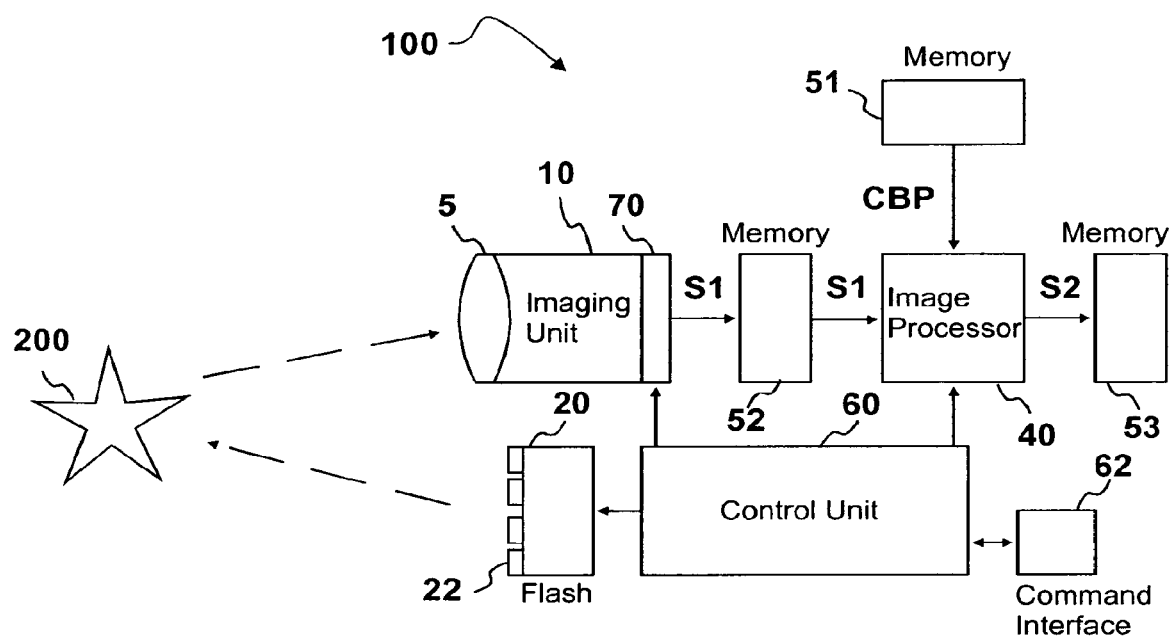
FIG. 1 shows schematically an imaging device adapted to take an image of an object.

Referring to FIG. 1, an imaging device 100 comprises an imaging unit 10, flash light unit 20, control unit 60, image processor 40, and one or more memory areas 51, 52, 53. The imaging unit 10 comprises imaging optics 5 and an image sensor 70. The flash light unit 20 may comprise a group of light emitting diodes 22 (LEDs) and suitable driver electronics. The flash light unit 20 may also comprise a gas discharge flash lamp, e.g. a xenon flash lamp.

The image of an object 200 is taken by illuminating the object with light provided by the flash light unit 20, acquiring the image of the object 200 by the imaging unit 10, and correcting the image colors by the image processor 40. The image is processed in digital form. The image colors are corrected using predetermined color balance parameters CBP which may be stored in a first memory area 51. A second memory area 52 and a third memory area 53 may be used to store the acquired image before and after the color correction. S1 denotes the acquired image data before correction and S2 denotes image data after correction.

The colors of the corrected image should be as close as possible to the colors of the object 200. When the object is white, also the color-corrected image of the object 200 should be white.

The color balance parameters CBP are predetermined in advance, for example several days or weeks before the actual image will be acquired.

The control unit 60 controls e.g. the timing of the operations. The imaging optics 5 is typically a group of lenses. The color-sensitive image sensor 70 may be e.g. a CMOS sensor (complementary metal-oxide semiconductor) or a CCD (charge coupled device) sensor. The memory area 52 may also be incorporated in the image sensor 70 as a shift register to store the acquired image before further processing.

The flash light unit 20 may comprise one or more white LEDs, and/or one or more colored LEDs. For example, a combination of red, green and blue LEDs provides substantially white light. For example, colored LEDs may be used in combination with white LEDs to adjust the color temperature of the emitted light. Alternatively, the flash light unit 20 may also comprise one or more gas discharge flash lamps, e.g. a xenon flash lamp.

The user may send commands to the imaging device 100 via the command interface 62. The user may take an image simply by pushing a button on the interface 62. The interface 62 may further comprise a data link based on an electrical connector, infrared light, and/or radio frequency communication.

FIG. 2a shows schematically the image pixels 71 of an image sensor 70. The image sensor may comprise several millions of image pixels arranged in rows and columns. Referring to FIG. 2b, each pixel 71 of the image sensor 70 may consist of sub-pixels 72, 73, 74 adapted to detect different colors. For example, the sub-pixel 72 may be adapted to detect the red color, the sub-pixel 73 to detect the green color, and the sub-pixel 74 to detect the blue color. The sub-pixels 72, 73, 74 provide together the red, green and blue color components of the image pixel 71. The values of the red, green and blue components of the image pixel 71 specify together the color of the image pixel 71 and the color of the respective image point.

Referring to FIG. 2c, the image sensor 70 may also be a Bayer image sensor. The Bayer image sensor 70 may comprise several millions of sub-pixels 72, 73, 74, 75 arranged in rows and columns. Those sub-pixels 72, 73, 74, 75 which are near each other in a 2×2-formation may be grouped together to constitute an image pixel 71 of the Bayer image sensor 70. Depending on the subsequent signal processing algorithms, each sub-pixel 72 may be considered to belong to one, two or four different image pixels 71. For example, the sub-pixel 72 may be in the top left corner, top right corner, bottom left corner or bottom right corner of different partially overlapping image pixels 71. The Bayer image sensor 70 may comprise several millions of image pixels.

Referring to FIG. 2d, each image pixel 71 of the Bayer image sensor 70 consists of sub-pixels 72, 73, 74, 75 adapted to detect different colors. Typically, the sub-pixels 72 are adapted to detect red color, the two sub-pixels 73 and 75 are adapted to detect green color, and the sub-pixels 74 are adapted to detect blue color. The sub-pixels 72, 73, 74, 75 provide together the red, green and blue color components of the image pixel 71.

Figure 3:
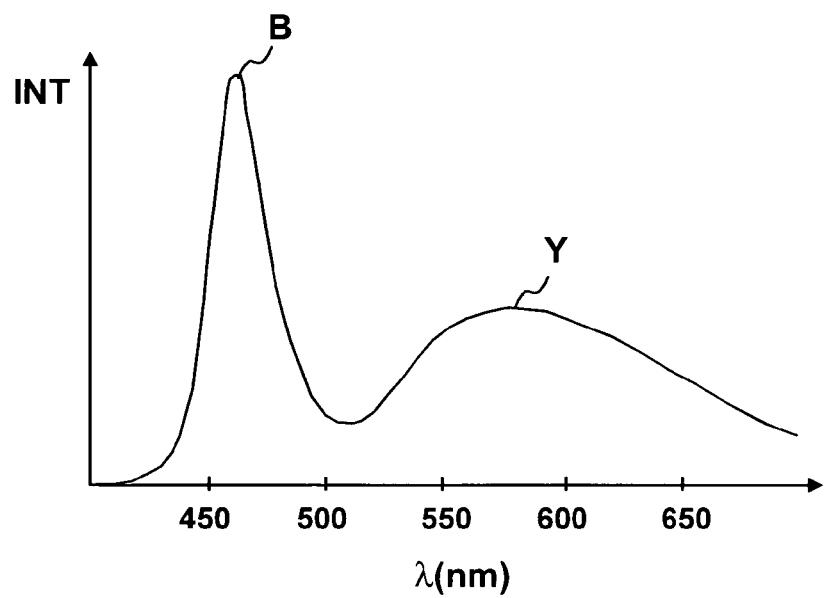
FIG. 3 shows, by way of example, typical spectral intensity of light emitted by white LEDs.

FIG. 3 shows typical spectral intensity of light emitted by white LEDs. The curve of FIG. 3 represents average spectral properties of a large number of white LEDs. The spectral intensity exhibits a first peak at the blue color B and a second broad peak at the yellow color Y. INT denotes intensity, $\lambda$ denotes wavelength, and nm is the abbreviation for nanometer.

Figure 4:
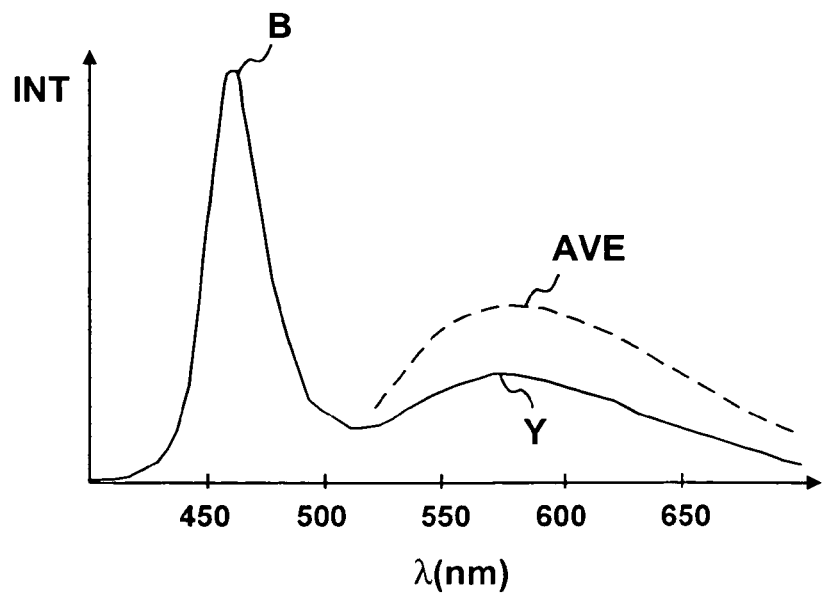
FIG. 4 shows, by way of example, spectral intensity of light emitted by an individual white LED.

Referring to FIG. 4, the spectral distribution of an individual LED may deviate substantially from the average spectrum, assuming predetermined operating current and operating conditions. For example, the peak at the yellow color Y may be considerably suppressed when compared with the average characteristics denoted by the dashed curve AVE.

In mass production, the characteristics typically deviate from LED to LED and from batch to batch. The LEDs may be sorted to groups according to their spectral properties, but the sorting of a large number of LEDs is difficult. The sorting becomes impossible when the LEDs of a first batch are installed into the imaging devices 100 before the LEDs of a second batch are manufactured. The flash light unit 20 may comprise one or more LEDs selected from a group of LEDs. It is likely that the spectral distribution of light emitted by said flash light unit 20 deviates, at least to some extent, from the average and/or assumed spectral distribution of said group. The spectral distribution of emitted light is specific to said individual flash light unit 20. The distribution deviates, with a high probability, from the distributions of the other flash light units.

The spectral distribution emitted by white LEDs depends on the operating current. The blue peak of the emitted spectrum is typically enhanced with respect to the yellow peak at higher values of the operating current. The spectral distribution may depend also on the duration of the current pulse, pulse shape and/or the repetition rate of the flashes.

The spectral distribution emitted by gas discharge flash lamps may depend on the operating current and flash duration, and the distribution may exhibit variations from lamp to lamp and from batch to batch.

The spectral response of the image sensors 70 may exhibit variations, which may further cause incorrect color reproduction.

If the image of the object 200 is taken using light according to FIG. 4, but the color correction is made assuming the spectrum of FIG. 3, then the image colors appear bluish.

Figure 5:
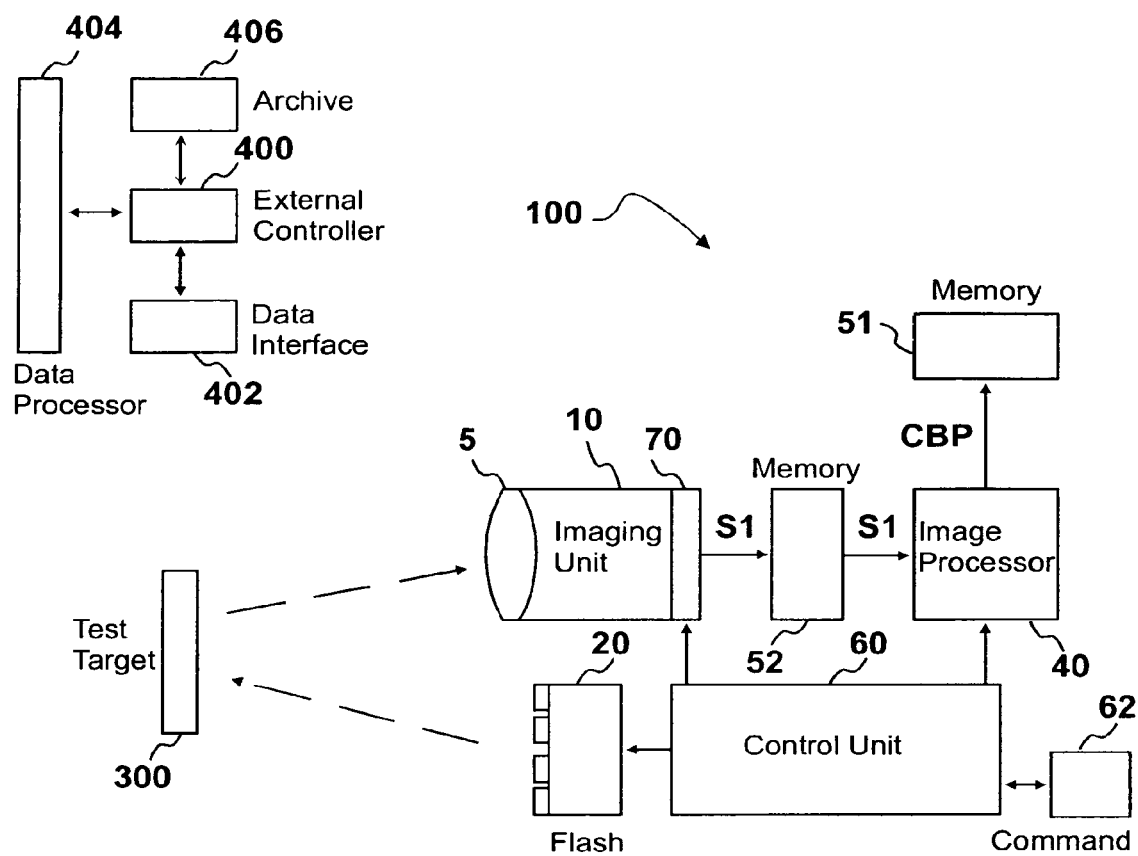
FIG. 5 shows schematically a calibration set-up for determining color balance parameters.

Referring to FIG. 5, the imaging device 100 may be calibrated to take into account the spectral properties of its individual flash light unit 20 and/or its image sensor 70. A neutral color test target 300 is positioned into the field-of-view of the imaging optics 10 and illuminated by the light provided by the flash light unit 20. Color balance parameters CBP are determined based on the image of the test target 300. The color balance parameters CBP may be stored into the memory area 51.

Neutral color means that the test target 300 is white or grey. The calibration target 300 may be a white target, e.g. a piece of white polytetrafluoroethylene (PTFE), opaque white glass, or a plate painted with titanium dioxide.

In principle, also a colored test target 300 may be used as long as it reflects light at a wide spectral range. However, its uneven spectral reflectance needlessly complicates the calibration procedure.

In the mass-production of a plurality of imaging devices 100, the test target 300 may be set-up at a predetermined point of the assembly line. The same test target 300 may be used for all the imaging devices 100. The imaging devices are brought in the vicinity of the text target 300 such that one or more test images may be taken. The test images are preferably taken in a dark enclosure such that ambient light does not affect the determination of the color balance parameters CBP.

The automatic determination of the color balance parameters CBP may be controlled by an external controller 400 which has a data interface 402 and a data processor 404. The data interface 402 is compatible with the interface 62 of the imaging unit 100. A command to take the image of the test target may be sent to the imaging device 100 via the interfaces 402, 62. The command signal may be an electronic, optical or radio frequency signal. The interface may also comprise a mechanical actuator to push a button on the interface 62 of the imaging device 100.

The data processing associated with the determination of the color balance parameters CBP may be performed by the image processing unit 40 of the imaging device 100 and/or by the external data processor 404. The interfaces 402, 62 may be used for communicating the image data and/or the color balance parameters CBP.

The determined color balance parameters CBP may also be stored in an external archive 406, in addition to the internal memory area 51. The operating current of the flash light unit 20 may be varied via the interfaces 402, 62.

It is assumed in the following example that the acquired image is in the RGB-format (red, green, blue). The image may also be in some other format, e.g. in the CMYK-format (cyan, magenta, yellow).

The color of an image pixel 71 may be expressed in terms of red $C_R$, green $C_G$ and blue $C_B$ component of said pixel, i.e. in terms of the signal values of the sub-pixels 72, 73, 74 of said pixel 71. For example 8-bit bytes may be used for storing the color component values. Thus, each component may assume values e.g. in the range of 0 to 255, providing 16.8 million different color combinations. Also 10-bit, 12-bit or longer bytes may be used for storing the image data.

Figure 6:
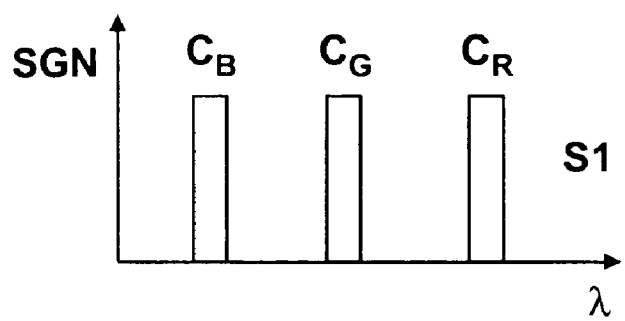
FIG. 6 shows the red, green and blue components of an image pixel under natural light, when a neutral target is imaged using natural light.

Referring to the bar graph shown in FIG. 6, the red $C_R$, green $C_G$ and blue $C_R$ components of the image pixel should have equal values when a white object is imaged using flash light. SGN denotes the value of the color component in arbitrary units. The color component values are typically stored and processed in digital form. The color component values may also be in analog form, e.g. as a charge in the image sensor 70.

Figure 7:
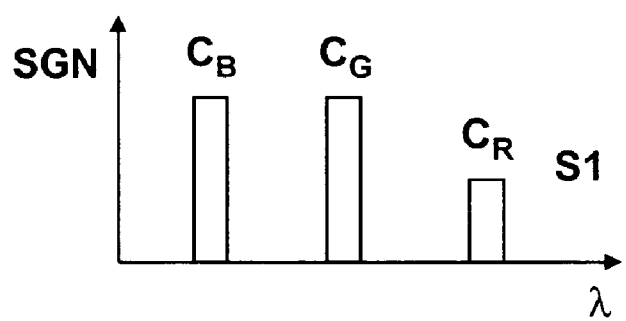
FIG. 7 shows, by way of example, red, green and blue components of an image pixel when a neutral target is imaged using flash light.

The spectrum of the flash light may deviate from the assumed spectrum. Consequently, the relative magnitudes of the red R, green G and blue B components may not be equal. For example, the red R component may be suppressed with respect to the green G and blue B components, as shown in FIG. 7.

Referring back to FIG. 5, the imaging optics 10 collects flash light reflected from the test target 300 and focuses an image of the test target 300 onto the pixels 71 of the image sensor 70. In order to determine the color balance parameters CBP, the average levels of the color components $C_R$, $C_G$, $C_B$ are first calculated for a group of image pixels 71 which correspond to the image of the test target 300, i.e. for pixels which are completely covered by the image of the test target 300. A rectangular group of pixels 71 may be selected. Due to the non-ideal behavior of the imaging optics 5 in the periphery of the image area, it is advantageous to select the width of said group to be substantially smaller than width of the image sensor 70. The width of said group should be smaller than the width of the image of the target 300.

Based on the image of the test target 300, the average level $AVE_G$ of the green components of the selected group of pixels 71, the average $AVE_B$ of the blue components and the average level $AVE_R$ of the red components are calculated. The average level $AVE_G$ of the green components may be selected as a reference. Consequently, three color balance parameters $GAIN_R$, $GAIN_G$ and $GAIN_B$ may be calculated:

$$GAIN_R = \frac{AVE_G}{AVE_R}, \quad (1)$$

$$GAIN_G = \frac{AVE_G}{AVE_G} = 1, \text{ and} \quad (2)$$

$$GAIN_B = \frac{AVE_G}{AVE_B}. \quad (3)$$

In other words, the parameter $GAIN_R$ is equal to the average ratio of the green color component to the red color component, as calculated based on the green and red components of the pixels in the selected group. The parameter $GAIN_B$ is equal to the average ratio of the green color component to the blue color component.

The color balance parameters $GAIN_R$, $GAIN_G$ and $GAIN_B$ may be calculated by the image processor 40 and stored into the memory area 51. Alternatively, an external data processor 404 may be used, as the determination of the color balance parameters is not needed when images are taken by an end-user.

If the red color is selected as the reference, the numerator of the equations (1), (2) and (3) is replaced with $AVE_R$. If the blue color is selected as the reference, the numerator of the equations (1), (2) and (3) is replaced with $AVE_B$. In order to minimize the risk of byte overflow, it is advantageous to select as the reference a color, which has the greatest average level.

Sometimes it may be difficult to multiply a predetermined color component also due to other technical reasons. In that case it is advantageous to select that predetermined color as the reference color.

The test target 300 is removed away from the field of view of the imaging unit 10 after the color balance parameters $GAIN_R$, $GAIN_G$ and $GAIN_B$ have been determined and stored into the memory 51. In practice, the target 300 may remain stationary in the assembly line when the imaging device 100 is removed from a calibration jig, and when a next mechanically similar imaging device is positioned into the same calibration jig.

When the image of an actual object 200 is taken at a later stage (FIG. 1), the colors of the image may be corrected by multiplying the red component $C_R$ of each image pixel with the predetermined color balance parameter $GAIN_R$, by multiplying the green component $C_G$ of each image pixel with the predetermined color balance parameter $GAIN_G$, and by multiplying the blue component $C_B$ of each image pixel with the predetermined color balance parameter $GAIN_B$. The multiplication may be omitted when the value of a parameter is one.

The actual object 200 may be e.g. a person, vehicle, animal or landscape.

Figure 8:
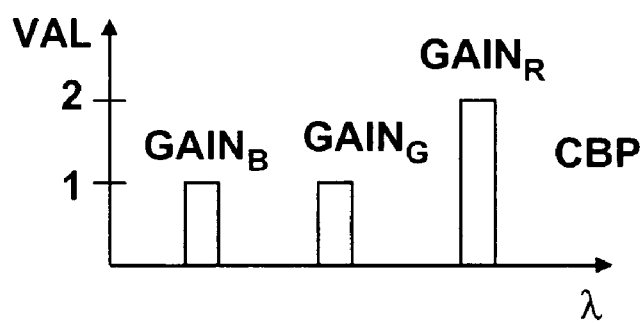
FIG. 8 shows color correction parameters related to the illuminating conditions according to FIG. 7.
Figure 9:
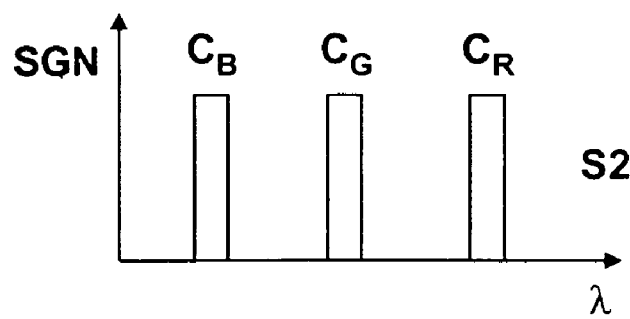
FIG. 9 shows the red, green and blue components of an image pixel after multiplication by the color correction coefficients of FIG. 8.

Now, for example, when an image of a white object 200 is taken in the flash light, the relative magnitudes of the components $C_R$, $C_G$, $C_B$ of an image pixel 71 may be similar to the ones shown in FIG. 7. In order to correct the color of the image pixel 71, the components $C_R$, $C_G$, $C_B$, as provided by the sub-pixels 72, 73, 74, are respectively multiplied by $GAIN_R$, $GAIN_G$ and $GAIN_B$ according to FIG. 8. VAL denotes the value of the numerical parameters. The resulting color-corrected distribution is shown in FIG. 9, corresponding to a white image pixel. The multiplications are made for each pixel 71 of the image (FIG. 2a). Typically, several millions of multiplications are performed, advantageously in a few milliseconds.

The ratios $GAIN_R$, $GAIN_G$ and $GAIN_B$ may be directly used as the color balance parameters CBP and stored in the memory area 51 as such. However, the color balance parameters $GAIN_R$, $GAIN_G$ and $GAIN_B$ may also be multiplied in advance by a same coefficient before applying the color correction, in order to adjust the brightness of the image simultaneously with the color balance correction. In that case the color balance parameters CBP are proportional to the ratios $GAIN_R$, $GAIN_G$ and $GAIN_B$. If the coefficient is greater than one, the image gets brighter. If the coefficient is smaller than one, the image gets darker. Thus, the number of mathematical operations and the time required for the calculations may be reduced. In order to minimize the time needed for the processing, each color component of each image pixel 71 is advantageously multiplied only once. In other words, the value provided by each sub-pixel 72, 73, 74 is advantageously multiplied only once.

The color correction may be performed e.g. when the image is e.g. in the RGB (red green blue) format, raw Bayer format (R, Gr, Gb, B), or CMYK-format (cyan magenta yellow). The color correction parameters may be also determined e.g. for cyan, magenta and yellow, instead of the red, green and blue.

The colors of image pixels 71 of a Bayer image sensor 70 (FIG. 2d) are originally in the raw Bayer format (R, Gr, Gb, B). In that case the color of each image pixel 71 is originally specified by four color components, said pixel consisting of four sub-pixels 72, 73, 74, 75. The sub-pixel 72 provides the red component, the sub-pixel 74 provides the blue component, the sub-pixel 73 provides a first green component and the sub-pixel 75 provides a second green component of the pixel 71. The first and the second green components may be processed separately, or they may be summed or averaged prior to further processing.

In case of the raw Bayer format, color correction parameters may be determined and applied separately for both green components Gr, Gb. Alternatively, the components Gr, Gb may also be summed and processed as a single color. The average of the first and the second color components Gr, Gb may be calculated prior to further processing.

When the image is in some other form, e.g. YUV or jpeg format, it may be converted into e.g. RGB or CMYK-format before performing the color correction. However, it is advantageous to perform the color correction at an early stage, before the compression of the image data.

In low-cost image sensors 70 the optical exposure of the image pixels 71 may take place at different time intervals, i.e.

not simultaneously. Thus, the multiplications needed for correcting the colors of the first image pixels may be performed already before the optical exposure of the last pixels of the image is finished. The optical exposure time means the time period during which light reflected from the object 200 contributes to the signal level of a pixel.

The color correction may be applied to each pixel 71 or sub-pixel 72, 73, 74 as soon as the signal value of said pixel or sub-pixel is established, i.e. on the fly. Consequently, the color correction may be performed for the whole acquired image almost immediately after the optical exposure of its last pixel or sub-pixel is finished. Thus, a minimum time is needed for processing the acquired image before starting the optical exposure for a subsequent image. The size of the memory area 52 or a shift register which is used to transfer the image from the image sensor 70 to the image processing unit 40 may be smaller than the size of the acquired image. In some cases the memory area 52 may be completely omitted.

The power handling capacity of the LEDs 22 of the flash light unit 20 or its driver electronics may set constraints to the minimum time between two subsequent flashes, when acquiring two subsequent images.

The color of an image pixel 71 is specified by the relative values of the color components of said pixel 71. The color component values are interpreted as colors according to the selected standard or format of the image data. One way to specify a neutral color or a white color is that the red, green and blue components have equal values. The target accuracy of the color correction may be specified such that the values of the red and blue components are within 1% of the value of the green component. Also narrower or wider tolerances may be applied, e.g. 0.5%, 2% or 5%.

The coefficients $GAIN_R$, $GAIN_G$ and $GAIN_B$ may be stored in the memory area 51 for example in the u16.8 format, which means that an actual gain value is multiplied by the number 256, and truncated to an unsigned integer, which is stored as a 16-bit word in the memory.

The color balance parameters CBP may be determined and applied in various different ways. For example, the ratios of the color components may be determined for each pixel 71 corresponding to the image of the test target 300, and the ratios may be averaged to obtain the color balance parameters CBP. For example, the color balance parameters may be defined in an inverse way when compared with the equations (1), (2), (3). Subsequently, the color components of the actual image may be divided by the color balance parameters, instead of the multiplication. Yet, three 8-bit color balance parameters may be combined to form a single 24-bit parameter.

Figure 10:
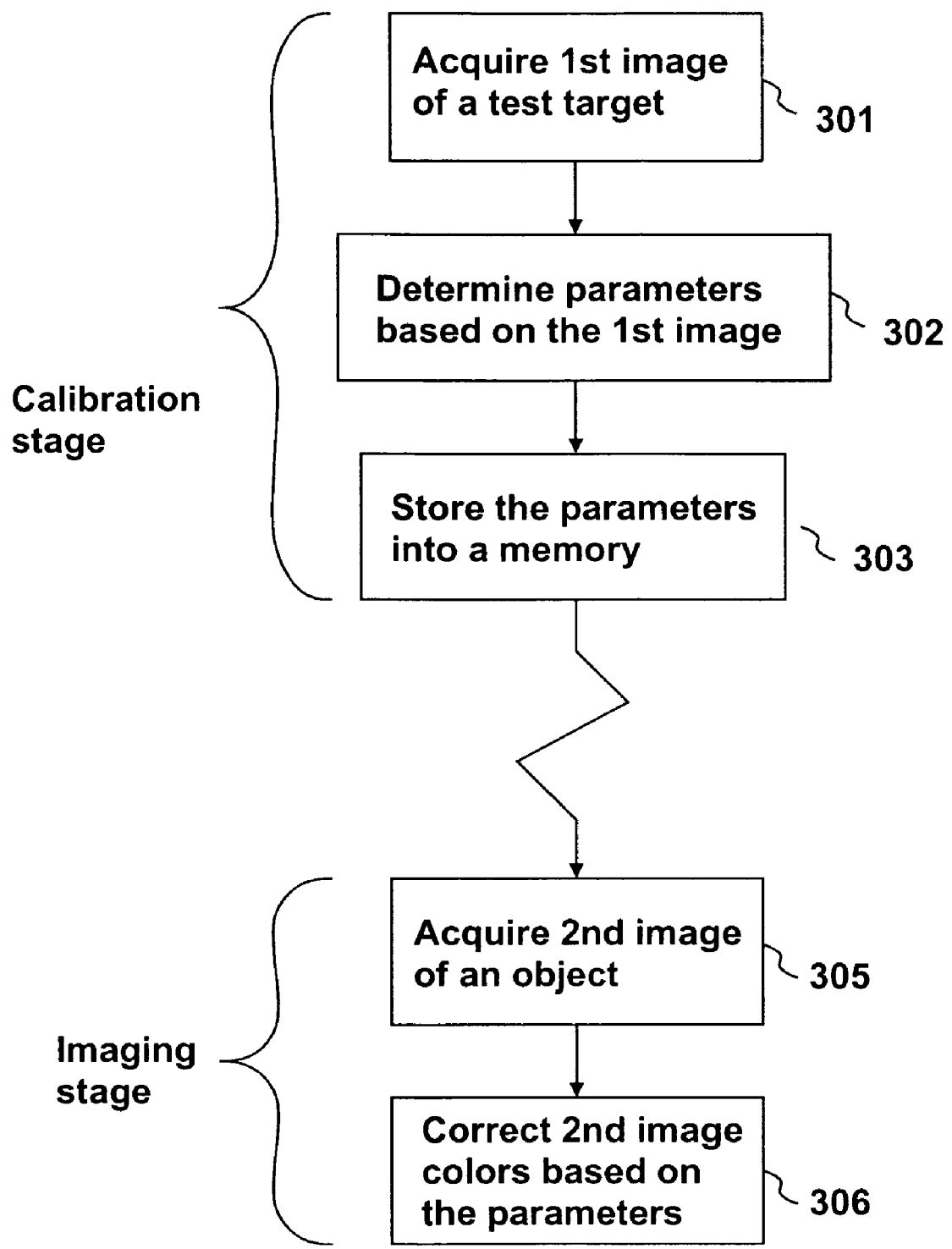
FIG. 10 shows the block diagram of taking a color-corrected image.

The calibration stage and the imaging stage according to the present invention are now summarized with reference to the block diagram of FIG. 10.

The calibration stage is advantageously performed in the series production of the imaging devices, i.e. in the factory. However, the calibration stage may also be performed in a service/maintenance shop if defective components of the imaging device 100 need to be replaced. The calibration stage comprises steps 301, 302, and 303.

In step 301, the neutral color test target 300 is illuminated by flash light provided by the flash light unit 20, and the test image of the test target 300 is acquired.

In step 302, the color balance parameters CBP are determined based on the test image of the test target 300.

In step 303, the color balance parameters CBP are stored in the memory of the imaging device 100.

The imaging stage is performed by the end-user of the imaging device 100. The imaging stage comprises steps 305 and 306.

In step 305, the imaging device 100 is arranged in the vicinity of the actual object 200, which is to be imaged, i.e. photographed. The object 200 may be e.g. a person or an artwork. The object 200 is arranged to be in the field of view of the imaging optics 10. The object is illuminated by flash light provided by the flash light unit 20, and the actual image of the actual target 200 is acquired.

In step 306, the color components of each image pixel of the actual image are corrected by using the predetermined color balance parameters CBP, which are specific to the individual flash light unit 20 used above in the steps 301, 302, 303.

The color balance parameters CBP of an imaging device 100 are matched with the spectral properties of the individual flash light unit 20 of said imaging device 100. Consequently, when two flash light units 20 have different spectral properties, they have also different sets of color balance parameters CBP.

Although the flash light unit 20 may comprise several LEDs 22, the color may be corrected using a single set of color balance parameters $GAIN_R$, $GAIN_G$ and $GAIN_B$, i.e. one value for $GAIN_R$, one value for $GAIN_G$ and one value for $GAIN_B$. However, the operating state of the flash light unit 20, i.e. the operating current, the duration of the current pulse, the pulse shape, and the number of activated LEDs may be selected according to the imaging situation. More optical energy is required when the object 200 is far away, and less when the object 200 is near. The color balance parameters $GAIN_R$, $GAIN_G$ and $GAIN_B$ are advantageously determined for each operating state of the flash light unit 20.

There may be also ambient light present in an imaging situation. The ambient light may be originate e.g. from fluorescent lamps, incandescent lamps, sun or blue sky. Image colors are affected by ambient light. The color correction according to the present invention may be applied also when ambient light is present, in addition to the flash light provided by the flash light unit 20. The relative contribution of ambient light to the total exposure may be estimated e.g. on the basis of images taken before or after the flash, and taking into account the distance between the imaging device and the object 200. To the first approximation, the relative contribution may be expressed using a parameter $k_{REL}$, which assumes values in the range of 0 to 1. The value of $k_{REL}$ is 1 when there is no ambient light. The value of $k_{REL}$ may be near to zero in bright sunlight and/or when the object 200 is far away from the imaging device 100.

The components $C_R$, $C_G$, $C_B$ of each image pixel may be divided into two parts by multiplying the components with factors $k_{REL}$, and $1-k_{REL}$. The color correction is applied to the components $k_{REL}C_R$, $k_{REL}C_G$, $k_{REL}C_B$, and the corrected component values, namely $GAIN_R\ k_{REL}C_R$, $k_{REL}C_G$, and $GAIN_B\ k_{REL}C_B$, are summed with the components $(1-k_{REL})C_R$, $(1-k_{REL})C_G$, and $(1-k_{REL})C_B$.

In other words the image is divided into two parts, a first part corresponding to flash light exposure and a second part corresponding to ambient light exposure. The color correction according to the present invention is applied to the first part. The corrected first and the second parts are superposed, i.e. summed together in order to form the final white-balanced image.

The colors of said second part may be corrected by auto white balancing algorithms, according to the color of ambient light, before the first part and the second part are superposed.

The color balance parameters CBP may also be stored in the archive 406 of the manufacturer, in addition to the internal memory area 51. The parameters CBP may be recovered from the archive and transferred again into the imaging device 100 e.g. when the software of the imaging device 100 is updated in a service shop. The archive is advantageously arranged such that each individual serial number of a manufactured imaging device 100 is associated with the device-specific color balance parameters CBP of said imaging device 100. The archive may also comprise information regarding the time and date of calibration. The color balance parameters CBP of the manufactured imaging devices 100 may also be statistically analyzed and used for quality control purposes.

The imaging device 100 may be, may be a part of, or may be used in combination with a device selected from the following list: a portable device, a device with wireless telecommunicating capabilities, image scanner, digital camera, mobile phone, personal digital assistant (PDA), communicator, portable internet appliance, and hand-held computer.

Color-balancing according to the present invention is especially advantageous in mass production of imaging devices 100, i.e. when a plurality of mechanically similar imaging devices is manufactured. Thanks to the invention, more consistent color reproduction may be provided in mass production of the imaging devices 100.

Thanks to the invention, variations in the spectral distribution of the flash light units 20 and/or variations in the spectral response of the image sensors 70 may be compensated by determining the color balance parameters according to the present invention. Considerable variations in the properties of the components may be allowed. Thus, unsorted image sensors 70, unsorted LEDs 22 and/or unsorted gas discharge flash lamps may be used as the components of the imaging devices, which substantially reduces the manufacturing costs. Especially, low-cost digital cameras may be implemented using fixed gain settings for the image color components.

There is no need to apply auto white balancing (AWB) algorithms when the image is taken in low illumination conditions using the flash light.

When ambient light is present, auto white balancing algorithms (AWB) may be applied to correct the contribution of the ambient light color. However, also in that case there is no need to extend the duration of the flash light pulse in order to provide time needed for executing the auto white balancing algorithms. In other words, there is no need to switch on the flash before the optical exposure of the image is actually started. The time period between the start of the flash and the finishing of the color correction may be substantially equal to the time period between the start of the optical exposure of the first pixel and the end of the optical exposure of the last pixel of the image.

The processing of the image may be performed on the fly, sub-pixel by sub-pixel. It is not necessary to reserve intermediate memory area 52 for storing the image data before the analysis and processing of the acquired image.

For the person skilled in the art, it will be clear that modifications and variations of the device and methods according to the present invention are perceivable. The particular embodiments described above with reference to the accompanying drawings are illustrative only and not meant to limit the scope of the invention, which is defined by the appended claims.

What is claimed is:

1. A method of manufacturing a plurality of portable imaging devices, said devices having substantially identical mechanical construction, said method comprising for each portable imaging device:

illuminating a test target by flash light provided by a flash light unit of said device, acquiring a test image of said test target by an imaging unit of said device, determining color balance parameters based on said test image, and storing said color balance parameters into a memory of said device, wherein each portable imaging device is configured to correct colors of a further image acquired by using said imaging unit such that a color of a first image pixel of said further image is corrected before optical exposure of a second image pixel of said further image is finished.

2. The method according to claim 1 wherein said determining of color balance parameters further comprises:

selecting a group of pixels of said test image, and calculating the average ratio of a first color component to a second color component based on the first and second color components of the pixels of said group.

3. The method according to claim 1 wherein the color balance parameters of a first imaging device are different from the color balance parameters of a second imaging device.

4. The method according to claim 1 further comprising selecting one or more light emitting diodes from a group of light emitting diodes, and making a flash light unit comprising said selected light emitting diodes, wherein the spectral properties of said selected light emitting diodes deviate from the average spectral properties of said group.

5. The method according to claim 1 wherein the spectral properties of a flash light unit of a first imaging device deviate from the spectral properties of a flash light unit of a second imaging device.

6. The method according to claim 1 wherein said test target has a neutral color.

7. The method according to claim 1 wherein said parameters are determined such that each of said imaging devices is adapted to provide the same color for the same object.

8. The method according to claim 1 wherein said parameters are determined such that each of said imaging devices is adapted to provide a white color for a white object.

9. The method according to claim 1 wherein said parameters are also stored in an archive outside said imaging device.

10. A method of adjusting the color balance of a portable imaging device comprising:

illuminating a test target by a flash light provided by a flash light unit of said device, acquiring a test image of said test target by an imaging unit of said device, determining color balance parameters based on said test image, and storing said color balance parameters into a memory of said device, wherein said imaging device is configured to correct colors of a further image acquired by using said imaging unit such that a color of a first image pixel of said further image is corrected before optical exposure of a second image pixel of said further image is finished.

11. A computer program product for determining color balance parameters for an imaging device, said computer program product comprising a readable medium stored with computer program code sections which when executed by a processor are for operating a flash light unit of said device, to illuminate a test target, operating an imaging unit of said device, to acquire a test image of said test target, calculating the average ratio of a first color component to a second color component based on the first and second color components of pixels of said test image, determining at least one color balance parameter on the basis of said ratio, and storing said at least one color balance parameter into a memory of said imaging device, and correcting colors of a further image acquired by using said imaging unit such that a color of a first image pixel of said further image is corrected before optical exposure of a second image pixel of said further image is finished.

12. A portable device comprising:

a flash light unit configured to illuminate an object, an imaging unit configured to acquire an image of the object a memory comprising predetermined color balance parameters specific to said flash light unit and determined by using said imaging unit, and an image processing unit configured to correct the color of said acquired image based on said color balance parameters such that a color of a first image pixel of said acquired image is corrected before optical exposure of a second image pixel of said acquired image is finished.

13. The device according to claim 12 configured to provide a neutral image color for a neutral color object when illumination is provided using said flash light unit.

14. The device according to claim 13 wherein said neutral image color is specified by a first color component, by a second color component, and by a third color component, the ratio of said first color component to said second color component being within 1% of a value corresponding to the neutral color, and the ratio of said third color component to said second color component being within 1% a value corresponding to the neutral color.

15. The device according to claim 12 wherein said correction of colors is configured to take place by multiplying a first color component of each image pixel by a first color correction parameter.

16. The device according to claim 15 wherein color components of each image pixel are configured to be multiplied only once.

17. The device according to claim 12 wherein the size of a memory area used for transferring an uncorrected image from an image sensor of said imaging unit is smaller than the size of the acquired image.

18. The device according to claim 12 wherein a time period between the start of the flash and the completion of the color correction of the acquired image is configured to be substantially equal to a time period between the start of the optical exposure of the first pixel and the end of the optical exposure of the last pixel of said acquired image.

19. The device according to claim 12 wherein said flash light unit comprises at least two white light emitting diodes having different spectral properties.

20. The device according to claim 12 wherein said image processing unit is further configured to correct the color of said acquired image by taking into account ambient light.

21. A method of acquiring an image, said method comprising:

illuminating an object by flash light provided by a flash light unit, acquiring a primary image of the object by using an imaging unit, and processing said primary image based on a set of predetermined color balance parameters stored in a memory comprising color balance parameters determined by using said imaging unit such that a color of a first image pixel of said primary image is corrected before optical exposure of a second image pixel of said primary image is finished.

22. The method according to claim 21 wherein said predetermined color balance parameters are determined by illuminating a test target by flash light provided by said flash light unit, acquiring a test image of said test target by using said imaging unit, determining said color balance parameters based on said test image, and storing said color balance parameters into a memory.

23. A portable device comprising:

means for illuminating an object, means for acquiring an image of the object, means for storing data, wherein said means for storing data comprises predetermined color balance parameters specific to said flash light unit and determined by using said means for imaging, and means for correcting the color of said acquired image based on said color balance parameters such that a color of a first image pixel of said acquired image is corrected before optical exposure of a second image pixel of said acquired image is finished.

24. The method of claim 1 further comprising varying the operating current of said flash light unit and storing the color balance parameters into the memory of the device such that said memory comprises several sets of color balance parameters determined by using said imaging unit, said sets of color balance parameters being specific to different operating currents of said flash light unit.

25. The device according to claim 12 wherein said memory comprises several sets of color balance parameters determined by using said imaging unit, said sets of color balance parameters being specific to different operating currents of said flash light unit.

26. The device of claim 25 wherein the operating current is selected according to a distance between the device and the object.

27. The device of claim 12 wherein the image processing unit is configured to correct the color of said acquired image by using color balance parameters corresponding to flash light exposure and by taking the relative contribution of ambient light into account.

28. The device of claim 27, wherein the relative contribution of ambient light to the total exposure is determined on the basis of a distance between the device and the object.

* * * * *

UNITED STATES PATENT AND TRADEMARK OFFICE
CERTIFICATE OF CORRECTION

PATENT NO.       : 7,570,881 B2
APPLICATION NO.  : 11/359874
DATED            : August 4, 2009
INVENTOR(S)      : Perälä et al.

It is certified that error appears in the above-identified patent and that said Letters Patent is hereby corrected as shown below:

1. At column 13, line 7, please delete the word "and"

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,570,881 B2  Page 1 of 1
APPLICATION NO. : 11/359874
DATED : August 4, 2009
INVENTOR(S) : Perälä et al.

It is certified that error appears in the above-identified patent and that said Letters Patent is hereby corrected as shown below:

1. At column 13, line 7, please delete the word "and" and insert -- , -- therefore.

This certificate supersedes the Certificate of Correction issued November 3, 2009.

Signed and Sealed this

Twenty-sixth Day of January, 2010

David J. Kappos
*Director of the United States Patent and Trademark Office*